(12) United States Patent
Bourcier et al.

(10) Patent No.: US 7,766,981 B2
(45) Date of Patent: Aug. 3, 2010

(54) ELECTRODE STACK FOR CAPACITIVE DEVICE

(75) Inventors: Roy Joseph Bourcier, Corning, NY (US); Todd St. Clair, Painted Post, NY (US); Andrew Nadjadi, Canisteo, NY (US); Vitor Marino Schneider, Painted Post, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 12/146,668

(22) Filed: Jun. 26, 2008

(65) Prior Publication Data

US 2009/0320253 A1 Dec. 31, 2009

Related U.S. Application Data

(60) Provisional application No. 61/004,892, filed on Nov. 30, 2007.

(51) Int. Cl.
*H01G 9/00* (2006.01)

(52) U.S. Cl. .................. 29/25.03; 361/301.4; 361/513; 361/523; 361/524; 438/396; 438/397

(58) Field of Classification Search ......... 438/396–397; 361/500–541, 301.4; 29/25.03
See application file for complete search history.

(56) References Cited

U.S. PATENT DOCUMENTS

| 4,023,079 A | 5/1977 | Selover, Jr. et al. ......... 361/433 |
| 5,437,941 A | 8/1995 | Arledge et al. .............. 429/129 |
| 5,443,859 A | 8/1995 | Nagata |
| 5,453,909 A * | 9/1995 | Kobayashi ................... 361/502 |
| 5,636,437 A | 6/1997 | Kaschmitter et al. |
| 5,776,633 A | 7/1998 | Mrotek et al. |
| 5,932,185 A | 8/1999 | Pekala et al. |
| 5,954,937 A | 9/1999 | Farmer |
| 6,214,204 B1 | 4/2001 | Gadkaree et al. |
| 6,713,034 B2 | 3/2004 | Nakamura et al. |
| 6,778,378 B1 | 8/2004 | Andelman |
| 6,979,513 B2 | 12/2005 | Kelley et al. |
| 2003/0104208 A1 | 6/2003 | Nesbitt et al. ............... 428/408 |
| 2007/0154779 A1 | 7/2007 | Ko et al. |

FOREIGN PATENT DOCUMENTS

| JP | 05159974 | 6/1993 |
| WO | 99/17864 | 4/1999 |
| WO | 03/001544 | 1/2003 |

OTHER PUBLICATIONS

Tassin et al; "Effects of Three-Dimensional Current Collectors on Supercapacitors' Characteristics"; Journal of Power Sources 65 (1997) 61-64.
Park et al; "Electrical Properties and Shrinkage of Carbonized Photoresist Films and the Implications for Carbon Microelectromechanical Systems Devices in Conductive Media"; Journal of The Electrochemical Society, 152 (12) J136-J143 (2005).

* cited by examiner

*Primary Examiner*—Charles D Garber
*Assistant Examiner*—Yasser A Abdelaziez
(74) *Attorney, Agent, or Firm*—Tina N. Thompson

(57) ABSTRACT

Capacitive devices are described having electrical interconnects of electrodes which possess efficient electrical contact between current collectors, electrical isolation of electrodes, and/or electrochemical stability, while minimizing the mechanical stress and strain applied to the electrodes. The capacitive devices are adaptable to a wide range of electrode dimensions and electrode stack heights.

11 Claims, 4 Drawing Sheets

ELECTRODE STACK FOR CAPACITIVE DEVICE

CROSS-REFERENCE TO RELATED APPLICATIONS

This application claims the benefit of priority to U.S. Provisional Application No. 61/004,892, filed on Nov. 30, 2007.

BACKGROUND

1. Field of the Invention

The present invention relates generally to a capacitive device and more particularly to a capacitive device comprising an electrical interconnect useful for electric double layer capacitors and/or for capacitive deionization.

2. Technical Background

Capacitors, like batteries, store energy in the electrical field between a pair of oppositely charged conductive plates. Developed more than 250 years ago, capacitors are frequently used in electrical circuits as energy storage devices. In recent years, new families of capacitive devices have been developed which are based on charge separation of ions in solution and the formation of electrical double layers.

An electric double layer capacitor (EDLC) is an example of a capacitor that typically contains porous carbon electrodes (separated via a porous separator), current collectors and an electrolyte solution. When electric potential is applied to an EDLC cell, ionic current flows due to the attraction of anions to the positive electrode and cations to the negative electrode. Electric charge is stored in the electric double layer (EDL) formed along the interface between each polarized electrode and the electrolyte solution.

EDLC designs vary depending on application and can include, for example, standard jelly roll designs, prismatic designs, honeycomb designs, hybrid designs or other designs known in the art. The energy density and the specific power of an EDLC can be affected by the properties thereof, including the electrode and the electrolyte utilized. With respect to the electrode, high surface area carbons, carbon nanotubes, activated carbon and other forms of carbon and composites have been utilized in manufacturing such devices. Of these, carbon based electrodes are used in commercially available devices.

Capacitive Deionization (CDI) is a promising deionization technology, for instance, for the purification of water. In this context, positively and negatively charged electrodes are used to attract ions from a stream or bath of fluid. The ions form electric double layers on the surfaces of the electrodes, which are fabricated from some form of high surface area material, for example, a form of activated carbon. After interaction with the electrodes during the charging period, the fluid contains a lower overall ion content and is discharged. A volume of purge fluid is then introduced to the electrodes. The electrodes are then electrically discharged, thus releasing the trapped ions into the purge fluid. The purge fluid is then diverted into a waste stream and the process repeated.

Electrically connecting electrodes to a power source is a challenging aspect for EDLC and CDI applications. Typically, electrodes are delicate, thus mechanical stressing and straining of the electrodes should be minimized. Minimizing the deformations applied to the electrodes is difficult, especially while attempting to maximize the electrical and mechanical integrity of an electrical interconnect to the electrodes.

U.S. Pat. No. 5,954,937 relates to an interconnection for resorcinol/formaldehyde carbon aerogel/carbon paper sheet electrodes. The fluid flow path is located between the surfaces of the electrode sheets. The active surfaces of these electrode sheets are delicate and should be protected from mechanical stressing. The electrode sheets are bonded to a current collector, in this case, a titanium sheet using a conductive carbon filled adhesive. The large area of contact between the electrode sheet and the current collector insure relatively low overall resistance despite the moderately high resistivity of the adhesive interface.

U.S. Pat. No. 6,778,378 relates to electrodes which may be rolled from carbon and fibrillated polytetrafluoroethylene (PTFE). Electrodes formed in this fashion are thin flexible sheets which can be contacted by high normal compressive forces. Electrodes may be stacked up with sheets of current collector material and a separator material and then clamped with a compressive force to obtain good electrical contact. By controlling which electrodes and current collectors are in physical contact, a capacitive cell may be formed.

In commonly owned U.S. Pat. No. 6,214,204, monolithic, low back pressure porous electrodes are made by one of several methods, which include honeycomb extrusion, casting or molding from a phenolic resin-based batch. After curing, these parts are carbonized and activated to create high surface area carbon monoliths with good electrical conductivity.

Discs are made and assembled in a stack and spaced such that the discs are electrically isolated from each other. The discs are connected to anode and cathode current collector/bus bar assemblies utilizing wires.

A variety of other approaches to electrically interconnecting electrodes have been considered in the art with one or more disadvantages as described below. Brazing or soldering alloys typically will not withstand either the EDLC or the CDI electrochemical environments. Brazing and/or soldering to carbon is difficult due, in part, to the low strength of activated carbon. Conductive adhesives formulated using highly conductive metal powders are costly and/or are prone to corrosion. Conductive adhesives formulated using carbon powders generally have insufficient electrical conductivity for use in a capacitor.

Conductive wire or strip leads mechanically fastened around the perimeter of a capacitive device provide adequate performance for small electrodes. However the resistive losses introduced by conducting charge around the circumference of the electrode in a small diameter wire or thin strip lead degrade performance, and no simple means has been found to use this attachment scheme while incorporating a high efficiency current collector. Also, the logistics of attaching leads to individual electrodes are not appealing.

It would be advantageous to have a capacitive device comprising an electrical interconnect to a linear stack of electrodes, which does not jeopardize the mechanical integrity of the electrodes. Also, it would be advantageous to have the electrical interconnect be electrochemically inert. Further, it would be advantageous to develop a capacitive device, comprising interconnected monolithic high surface area carbon electrodes, which is capable of non-impeded fluid flow through the electrodes, which is useful for, for example, CDI.

SUMMARY

Capacitive devices, as described herein, address one or more of the above-mentioned disadvantages of conventional capacitive devices and provide one or more of the following advantages: efficient electrical contact between alternating electrodes arranged in series in a linear stack, electrical isolation of adjacent electrodes and electrochemical stability, while minimizing the mechanical stress and strain applied to the electrodes. The capacitive devices of the present invention are adaptable to a wide range of electrode dimensions and electrode stack heights.

One embodiment of the invention is a capacitive device comprising planar electrodes arranged in series. A first electrically conductive carbon material provides electrical contact between at least two alternating electrodes, and an electrically insulating material is disposed between adjacent electrodes in the series.

Another embodiment of the invention is a method of making a capacitive device. The method comprises providing planar electrodes arranged in series, applying a first electrically conductive carbon material to one or more of the electrodes such that the first electrically conductive carbon material provides electrical contact between at least two alternating electrodes, and applying an electrically insulating material between adjacent electrodes in the series.

Additional features and advantages of the invention will be set forth in the detailed description which follows, and in part will be readily apparent to those skilled in the art from the description or recognized by practicing the invention as described in the written description and claims hereof, as well as the appended drawings.

It is to be understood that both the foregoing general description and the following detailed description are merely exemplary of the invention, and are intended to provide an overview or framework to understanding the nature and character of the invention as it is claimed.

The accompanying drawings are included to provide a further understanding of the invention, and are incorporated in and constitute a part of this specification. The drawings illustrate one or more embodiment(s) of the invention and together with the description serve to explain the principles and operation of the invention.

BRIEF DESCRIPTION OF THE DRAWINGS

The invention can be understood from the following detailed description either alone or together with the accompanying drawing figures.

DETAILED DESCRIPTION

Reference will now be made in detail to various embodiments of the invention, examples of which are illustrated in the accompanying drawings. Wherever possible, the same reference numbers will be used throughout the drawings to refer to the same or like parts.

Figure 1:
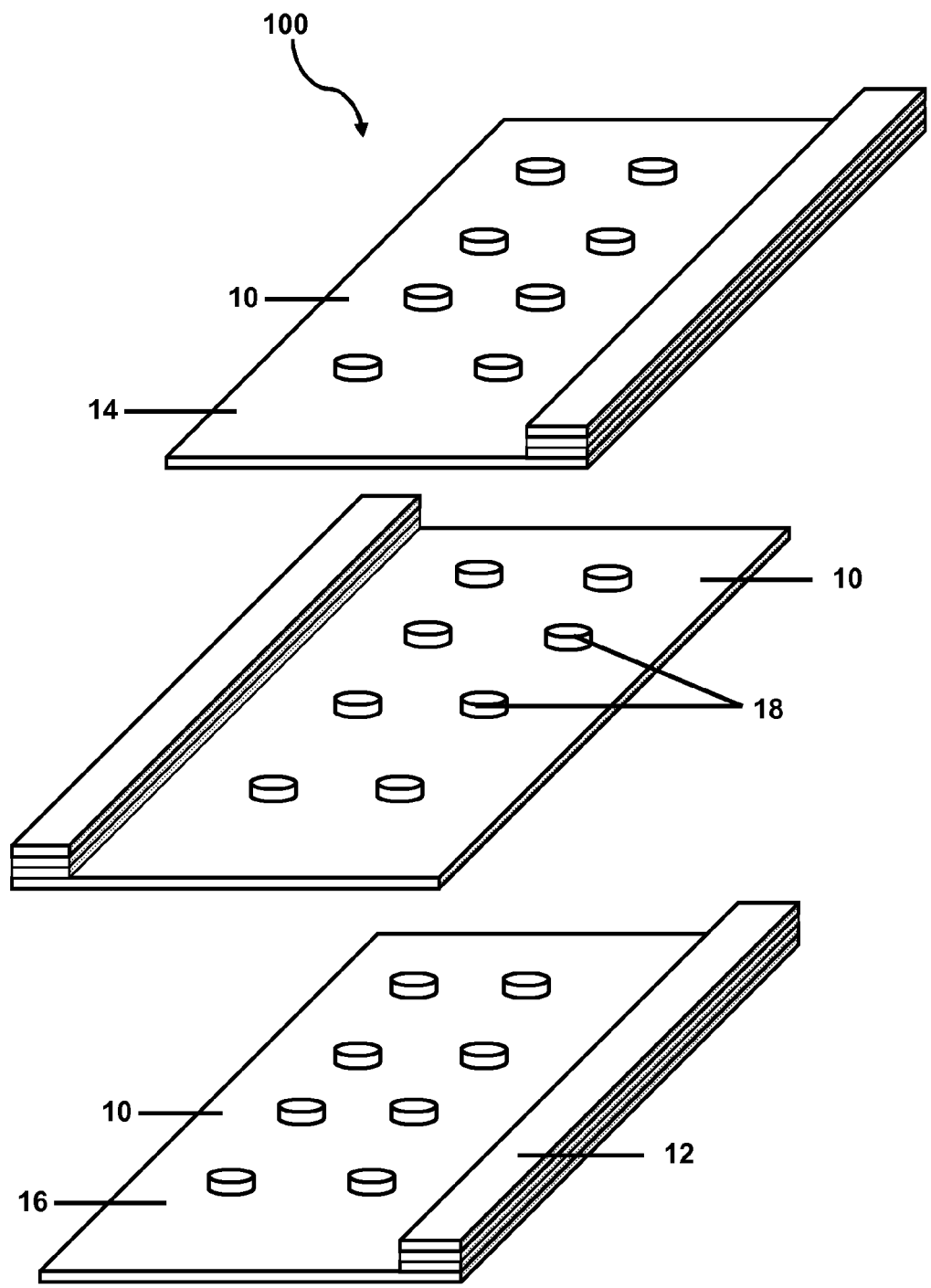
FIG. 1 is an exploded view schematic of features of a capacitive device according to one embodiment of the invention.
Figure 2:
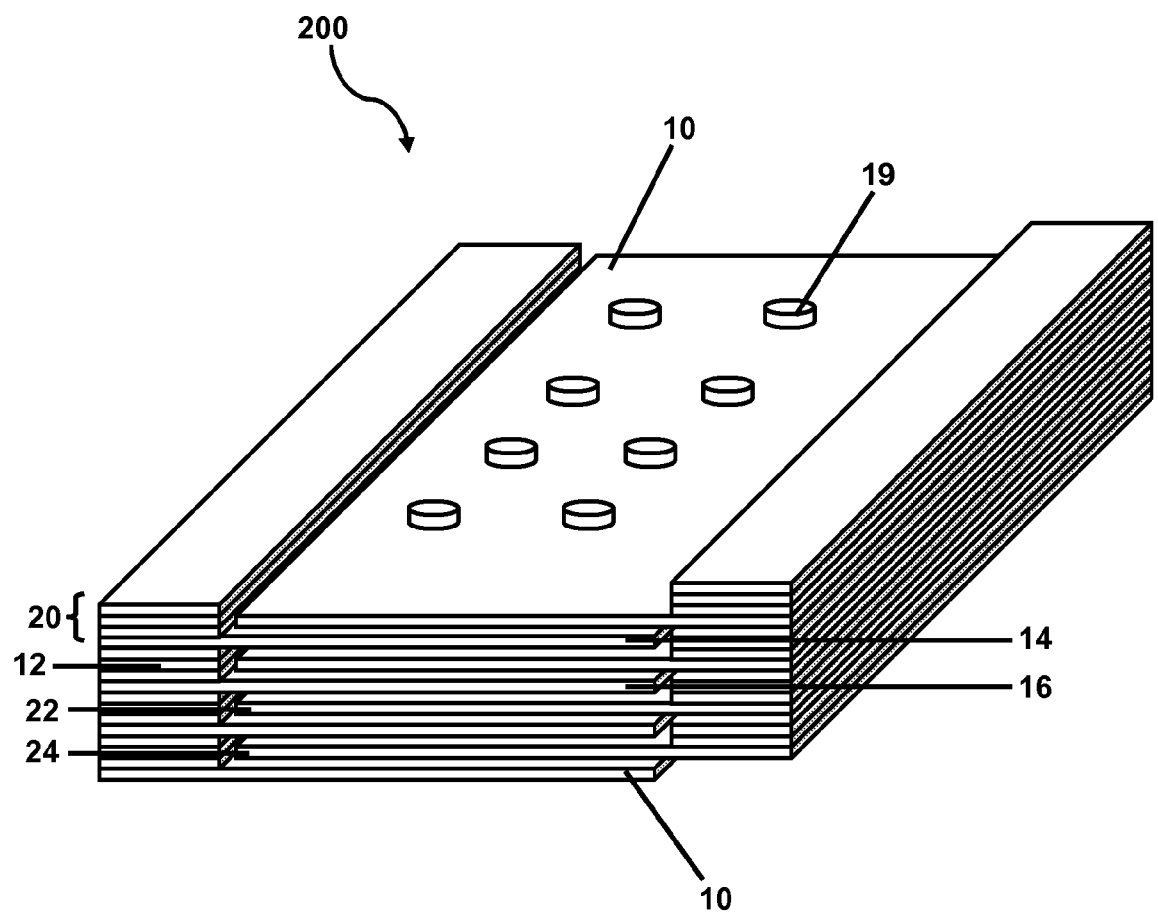
FIG. 2 is a schematic of features of a capacitive device according to one embodiment of the invention.

FIG. 1 and FIG. 2 show features 100 and 200 respectively of a capacitive device, according to one embodiment, comprising planar electrodes 10 arranged in series. A first electrically conductive carbon material 12 provides electrical contact between at least two alternating electrodes 14 and 16, and an electrically insulating material 18 (shown in FIG. 1) is disposed between adjacent electrodes in the series. The electrically insulating material 19 shown in FIG. 2 could be used to separate the electrode on which it is disposed from another electrode in the series or to separate the electrode on which it is disposed from an external housing.

A capacitive device can be formed by incorporating two or more current collectors applying a potential difference to alternating electrodes in the series, thus forming a capacitive device having a series of alternating anodes and cathodes. Any means known in the art can be used to supply the electrical charges to the current collectors.

In one embodiment, the capacitive device, as shown by features 200 in FIG. 2, further comprises a second electrically conductive carbon material 20 which provides electrical contact between at least two different alternating electrodes 22 and 24 in the series. The second electrically conductive carbon material is electrically isolated from the first electrically conductive carbon material 12.

Figure 3A:
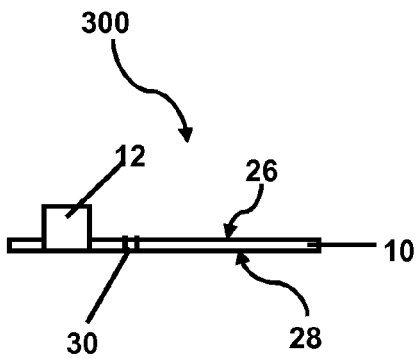
FIGS. 3a-3f are illustrations of exemplary placements of the electrically conductive carbon material according to some embodiments of the invention.

According to one embodiment, as shown by features 300 of a capacitive device, in FIG. 3a, at least one of the electrically conductive carbon materials 12 extends through one or more of the electrodes 10 from a first planar surface 26 to a second planar surface 28.

Figure 3B:
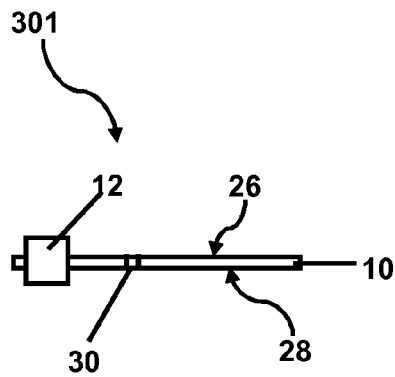

Features 301 of a capacitive device are shown in FIG. 3b. In this embodiment, the electrically conductive carbon material 12 extends through the second planar surface 28 and protrudes therefrom. The electrically conductive carbon material, in one embodiment, also shown in FIG. 3b, the electrically conductive carbon material is equally distributed in height extending from a first planar surface 26 and a second planar surface 28 of at least one electrode.

Figure 3C:
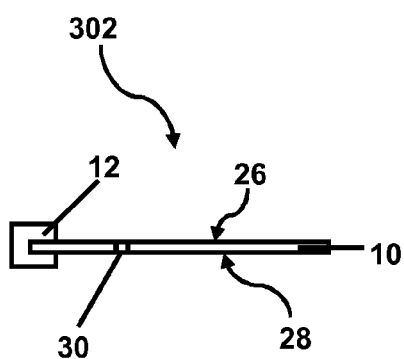
Figure 3D:
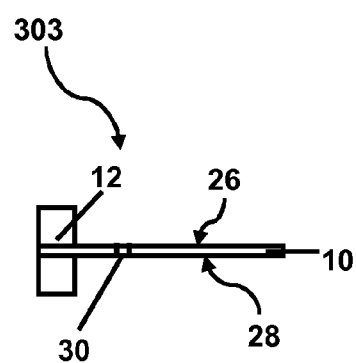

In another embodiment, as shown by features 302 and 303 in FIG. 3c and FIG. 3d, the electrically conductive carbon material 12 protrudes from the first planar surface 26 and the second planar surface 28. The electrically conductive carbon material, according to some embodiments, can protrude from either the first planar surface or the second planar surface or both planar surfaces. The protrusions do not have to be equally distributed.

Figure 3E:
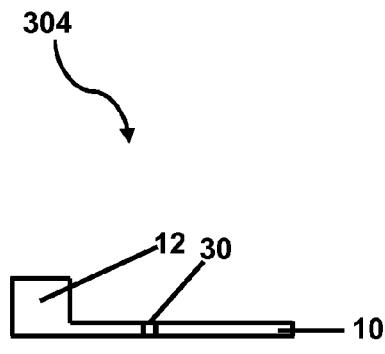

In another embodiment, the electrically conductive carbon material can be the same material as one or more of the electrode material(s). The electrode 10 and the electrically conductive carbon material 12, in one embodiment, can be a single molded piece as shown by features 304 of a capacitive device shown in FIG. 3e. Multiple protruding regions of electrically conductive carbon materials can be formed in a single composite element, in some embodiments.

Figure 3F:
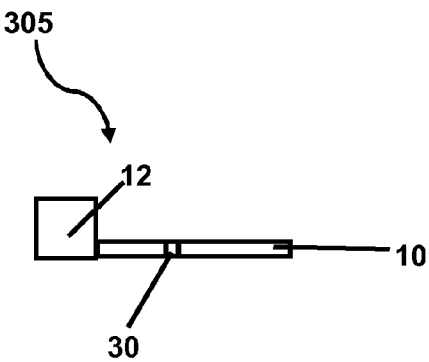

According to another embodiment, the electrically conductive carbon material 12 can be oriented along one or more edges of one or more of the electrodes 10, as shown by features 305 of a capacitive device shown in FIG. 3f.

In one embodiment, the electrically conductive carbon material is selected from a carbon paper, carbon fibers, carbon particles, carbon foam and combinations thereof.

Electrodes for the stack can be manufactured by methods known to those skilled in the art. Requirements for the electrode include good electrical conductivity and double layer capacitance, resistance to corrosion or electrochemical corrosion in electrolyte, and rigidity for packaging robustness. For example, the electrodes can have a layered structure whereby a backplane is incorporated in the electrode with EDLC materials adhered to the backplane surface.

Alternately, the electrodes could be a composite material where the EDLC is combined with a polymeric binder. Alternately, the EDLC can be directly incorporated into the structure of a porous backplane.

The electrodes can be any shape or size providing the electrode comprises a first face, an opposing second face and a thickness defined by an outer surface extending from the first face to the opposing second face. An electrode having flattened areas on the outer surface may facilitate improved electrical connections to a current collector also having a surface with flattened areas contacting the electrodes. The electrodes can be, for example, polygonal, circular, cylindrical, square, triangular, pentagonal, hexagonal or a combination thereof.

As shown in FIGS. 3a-3f, the electrodes can readily incorporate a hole 30 or an array of holes, for example, punched holes or other designs, which can be used to enable a hybrid parallel/transverse flow through CDI cell design. In one embodiment, one or more of the electrodes comprise one or more holes extending through the thickness of the electrode(s). The hole(s) can be, for example, from 1 mm to 10 mm in diameter.

The capacitive device, according to one embodiment, comprises an electrically insulating material disposed between adjacent electrodes. One function of the electrically insulating material is to electrically isolate opposing pairs of anodes and cathodes. The electrically insulating material should be electrochemically inert and electrically insulating. In addition, this material should also be mechanically rigid such that it can withstand mechanical compression.

Figure 4A:
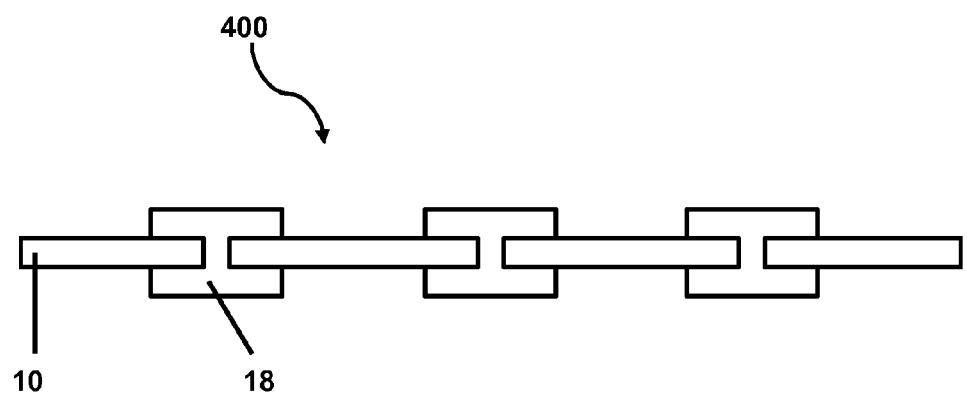
FIGS. 4a-4c are illustrations of exemplary placements of the electrically insulating material according to some embodiments of the invention.
Figure 4B:
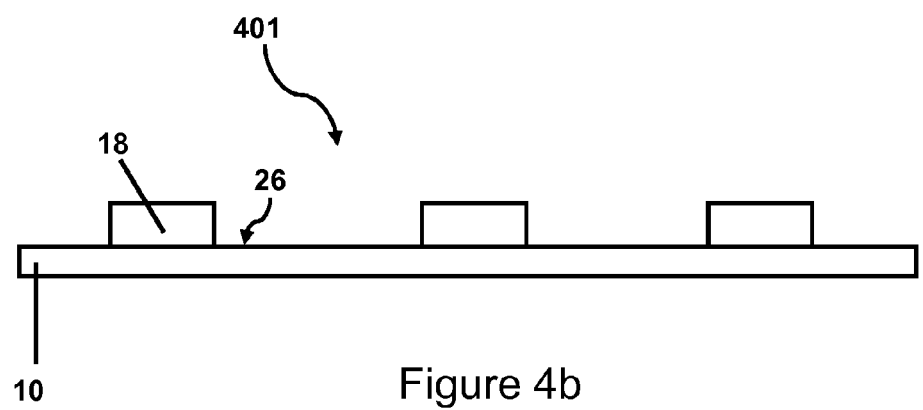

In one embodiment, as shown by features 401 in FIG. 4b, the electrically insulating material 18 protrudes from a first planar surface 26 of at least one electrode 10 in the series.

Figure 4C:
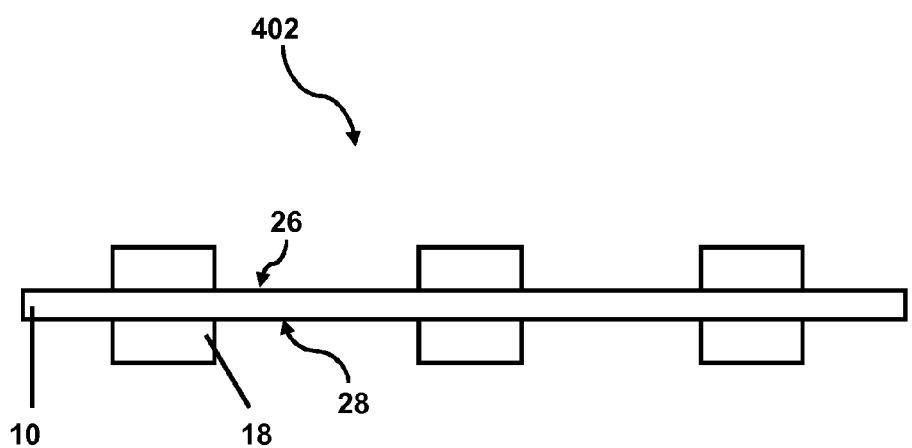

In another embodiment, as shown by features 402 in FIG. 4c, the electrically insulating material 18 protrudes from a first planar surface 26 of at least one electrode 10 in the series and from a second planar surface 28 of at least one electrode 10 in the series.

In another embodiment, as shown by features 400 in FIG. 4a the electrically insulating material 18 extends through one or more of the planar electrodes 10.

The electrically insulating material should be selected such that it does not outgas any components which may poison the capacitance of a surrounding electric double layer. As an example, some silicones contain organic impurities which, upon leaching, can adsorb onto and consequently poison carbon surfaces. Other polymers, including selected silicones, could be used such that poisoning is not a concern. Exemplary insulating materials may be selected from, for example, a silicone, a polymer, an elastomer, natural rubber, silicone rubber, butyl rubber, polybutadiene, nitrile rubber, polyurethane rubber, fluoroelastomers and combinations thereof.

The electrically insulating material may be in any form appropriate for use as an insulating material between adjacent electrodes. For example, it may be in the form of a sheet, a bead or beads, one or more discrete regions, and combinations thereof. According to one embodiment, the electrically insulating material is in a form selected from a sheet, a porous sheet, for example, a woven fabric or non-woven sheet, one or more discrete regions, for example, a strip or strips, a bead or beads, and combinations thereof. In some embodiments, the electrically insulating material is planar, for example, one or more discrete planar sheets.

The electrically insulating material can be formed using any method known in the art, for example, a method selected from lithography, photolithography, molding, printing, and combinations thereof.

When the electrically insulating material is in the form of discrete regions, such as polymer beads, the process used to pattern the polymer beads could be based on printing, molding, or photolithography, for instance. The number, spacing and dimensions of the beads will depend on characteristics of both the electrodes and the material composition. The number and spacing of beads will be determined by the stiffness of the electrodes, the amount of compressive force applied to the stack, and a determination of how much double layer capacity loss can be tolerated since the bead material detracts from the available capacitive geometric surface area. The dimensions of the beads will be primarily a function of the mechanical properties of the polymer and the compressive forces to be applied.

Another embodiment of the invention is a method of making a capacitive device. The method comprises providing planar electrodes arranged in series, applying a first electrically conductive carbon material to one or more of the electrodes such that the first electrically conductive carbon material provides electrical contact between at least two alternating electrodes, and applying an electrically insulating material between adjacent electrodes in the series.

In the embodiment shown in FIG. 1 and FIG. 2, strips of electrically conductive carbon material 12, for example, carbon paper are bonded to the edge of a larger sheet of carbon paper and carbonized to form an integrated current collector. Activated carbon is bonded to both surfaces of the current collector. Electrically insulating materials, for example, polymer insulator/separator features are molded/bonded to the surface of the electrode. Electrodes 10 are stacked in alternating "left-right" orientation to form an anode-cathode array. Compression is applied to complete electrical interconnection of the current collector assemblies.

The electrically conductive carbon material(s) used to build up a thick edge on the current collector of one or more of the electrodes should be conductive, electrochemically inert, and possess reasonable mechanical durability. A carbon-based material, specifically one that is graphitic in nature, is advantageous for its electrochemical inertness and high electrical conductivity. The mechanical durability of this material ensures that the spacing of the electrode capacitive gap is well-defined spatially. Furthermore, it is advantageous that the carbon material be porous such that it can be filled with a thermoplastic or a carbonizable material for the purpose of bonding it to the current collector. If a carbonizable resin or other polymer is used for bonding, then a conductive, porous, graphite-based paper is one example of a material that would meet the requirements of the material needed to form the bus bar on the edge of the electrodes.

In one embodiment, the application of the first electrically conductive carbon material comprises bonding one or more sheets of the electrically conductive carbon material to each electrode.

In one embodiment, the method further comprises subsequently bonding one or more sheets of the electrically conductive carbon material to the one or more sheets bonded to each electrode to form a stack of bonded discrete sheets.

In one embodiment, the applying an electrically insulating material between adjacent electrodes in the series comprises forming the electrically insulating material by lithography.

A lithography process can provide automated location of the electrically insulating material on one or more of the electrodes. For example, a photoresist that is sensitive to light, typically in the UV range of the spectrum can be used to pattern the electrically insulating material in a certain shape and/or pattern and/or location using a mask having the desired design. The mask can be reused and can be designed and manufactured, for example, using high quality glass or quartz. Small features, for example, in the micron range can be produced on one or more of the electrodes.

For large features a mask aligner and a simple UV lamp with collimated light, for example, can be used to pattern to a certain precision in the micron range. This can make the manufacturing process more accessible and of low cost.

The photoresist can be deposited by, for example, spin coating, tape casting or other methods known in the art. The thickness of the resist can be controlled, for example, by the viscosity of the photoresist and/or by the method of deposition. Certain photoresists, such as the SU-8 photoresist family, commercially available from MicroChem Corp., Newton, Mass., can provide thicknesses, for example, 50 µm or more with high uniformity.

Prior to irradiation with UV light, the deposited photoresist should be baked for a certain length of time at moderate temperatures as recommended by the photoresist manufacturer.

After irradiation with UV light the area of interest is formed, depending on the mask and photoresist choice, by developing the photoresist with a developer that is matched specifically to the photoresist chosen. The photoresist can be of positive type or negative type depending if one wants to design a mask that maintains or removes the area where the light reaches the substrate, in this case one or more of the electrodes. Other polymers such as polyimide can also be made photosensitive and can be used as the electrically insulating material, several of which are commercially available.

Moreover, a photoresist of the lift-off resist (LOR) can be used to pattern other materials. In this embodiment, the photoresist is patterned with openings on the top of its surface for the deposition of the electrically insulating material. The electrically insulating material, in this embodiment, can be another thick polymer or other material having similar properties as photoresist. In the developing process the LOR is removed from the substrate and lifts the undesired part of the material deposited. As a result only the desired electrically insulating material deposited remains.

The method, according to one embodiment, further comprises applying a second electrically conductive carbon material such that the second electrically conductive carbon material provides electrical contact between at least two different alternating electrodes in the series and is electrically isolated from the first electrically conductive carbon material.

EXAMPLE I

Strips of electrically conductive porous carbon sheet (preferably paper) are bonded along one or more edges of the electrode's integrated conductive porous carbon sheet current collector using a thermoplastic or a carbonizable polymer such as a curable resin. The polymer binder is then cured (if necessary) and carbonized, forming a thick conductive electrical contact strip. The thickness of this strip should be great enough to define the separation of the electrodes in the final array. The layers of high surface area carbon powder which form the EDLC electrode layer may be bonded to both sides of the sheet before, during or after this process (obviously after this process if the adhesive is not going to be carbonized). Small electrically insulating polymer contact beads may then be deposited to one or both sides of the EDLC electrode layer to serve as separators, providing electrical isolation and enforcing the thickness of the fluidic chamber between electrodes. A number of these electrodes are then stacked up, with the contact strips alternately oriented along opposite edges of the stack to develop an interdigitated array of alternately charged electrodes. Mechanical pressure is then applied to the stack normal to the surface of the bonded strips, either through use of a clamp or the use of a rigid housing. This pressure effectively forms two monolithic current collectors by enforcing good electrical contact throughout the two electrically isolated electrode arrays. Electrical connection to the outside world may then be made by either mechanical pressure or conductive adhesive bonding to the compressed current collector stacks.

Capacitive devices, for example, CDI cells produced according to the invention possess one or more of the following desirable characteristics: the use of integrated contact strips, for example, along the electrode edges provides a simple means for electrical connection as well as a means of mechanically defining the capacitive gaps between electrodes, integration of the electrically insulating material, for example, spacers across the electrode faces ensures electrical isolation between anode and cathode elements while simultaneously defining the capacitive gaps between electrodes, ease of assembly—the manufactured anode and cathode elements with electrical contacts and spacers are identical except that they are rotated 180° during the assembly process, and ease of packaging—once the stack is assembled, simple mechanical pressure is applied to ensure good electrical contact between anodes and cathodes, respectively.

It will be apparent to those skilled in the art that various modifications and variations can be made to the present invention without departing from the spirit or scope of the invention. Thus, it is intended that the present invention cover the modifications and variations of this invention provided they come within the scope of the appended claims and their equivalents.

What is claimed is:

1. A capacitive device comprising:
   planar electrodes arranged in series;
   a first electrically conductive carbon material providing electrical contact between at least two alternating electrodes; and
   an electrically insulating material disposed between adjacent electrodes in the series, wherein the electrically insulating material protrudes from a first planar surface of at least one electrode in the series.

2. The capacitive device according to claim 1, further comprising a second electrically conductive carbon material providing electrical contact between at least two different alternating electrodes in the series and electrically isolated from the first electrically conductive carbon material.

3. The capacitive device according to claim 1, wherein at least one of the electrically conductive carbon materials extends through one or more of the electrodes from a first planar surface to a second planar surface.

4. The capacitive device according to claim 3, wherein the electrically conductive carbon material extends through the second planar surface and protrudes therefrom.

5. The capacitive device according to claim 1, wherein the electrically conductive carbon material is equally distributed in height extending from a first planar surface and a second planar surface of at least one electrode.

6. The capacitive device according to claim 1, wherein the electrically insulating material is in a faun selected from a sheet, a porous sheet, one or more discrete regions and combinations thereof.

7. The capacitive device according to claim 1, wherein the electrically insulating material is selected from a silicone, a polymer, an elastomer, natural rubber, silicone rubber, butyl rubber, polybutadiene, nitrile rubber, polyurethane rubber, fluoroelastomers and combinations thereof.

8. The capacitive device according to claim 1, wherein the electrically insulating material extends through one or more of the planar electrodes.

9. The capacitive device according to claim 1, wherein the electrically insulating material is bonded to one or more of the planar electrodes.

10. The capacitive device according to claim 1, wherein one or more of the electrodes comprises a hole extending through the thickness of the electrode.

11. The capacitive device according to claim 10, wherein the hole is from 1 mm to 10 mm in diameter.

* * * * *